June 19, 1934.  C. T. CUTTING  1,963,779
PNEUMATIC DISPATCH SYSTEM
Filed Oct. 28, 1931   5 Sheets-Sheet 1
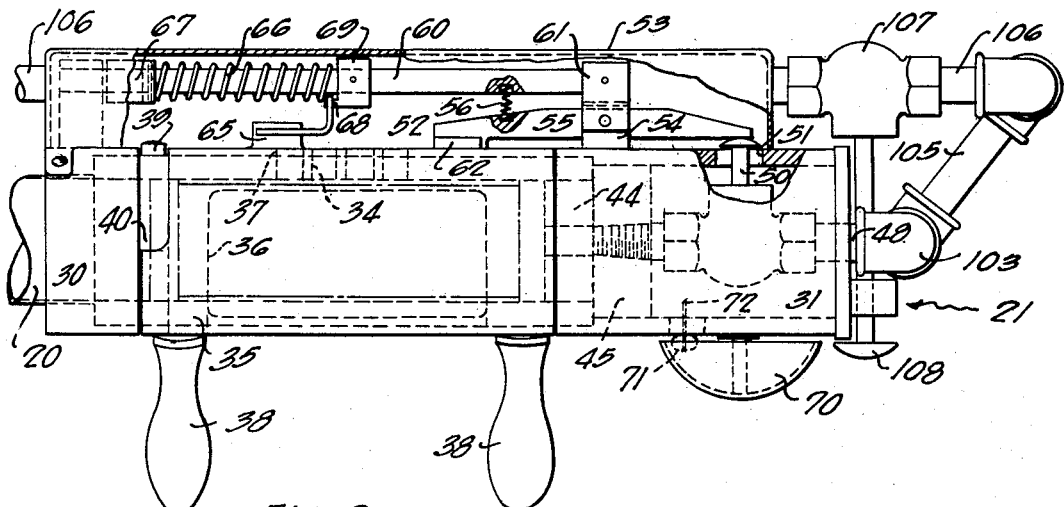
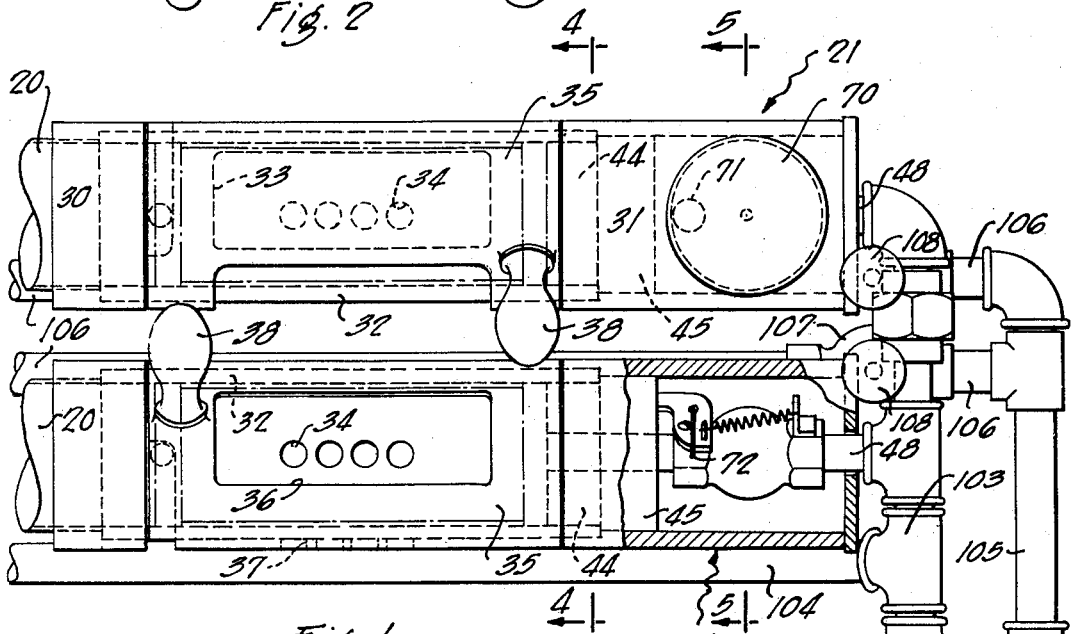
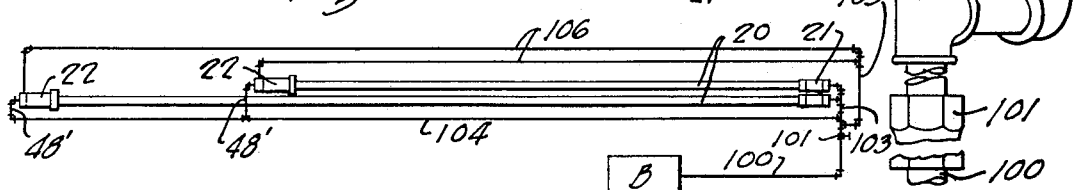
INVENTOR
CLARK T CUTTING
by Roberts Cushman Woodbury
ATTYS June 19, 1934.                C. T. CUTTING                1,963,779
                        PNEUMATIC DISPATCH SYSTEM
                  Filed Oct. 28, 1931        5 Sheets-Sheet 2

INVENTOR
CLARK T. CUTTING

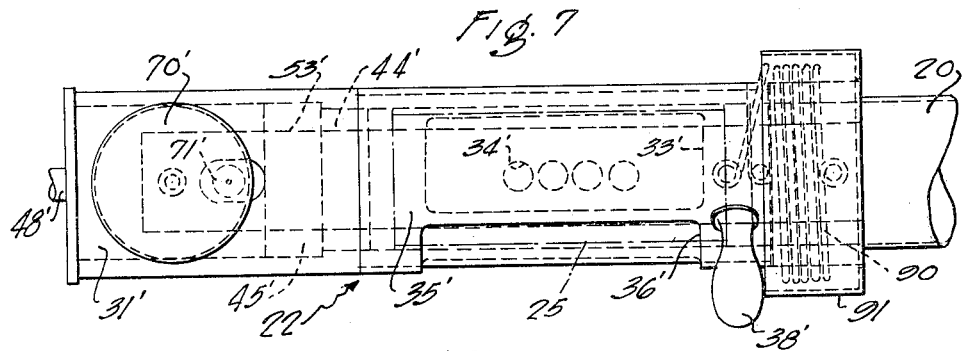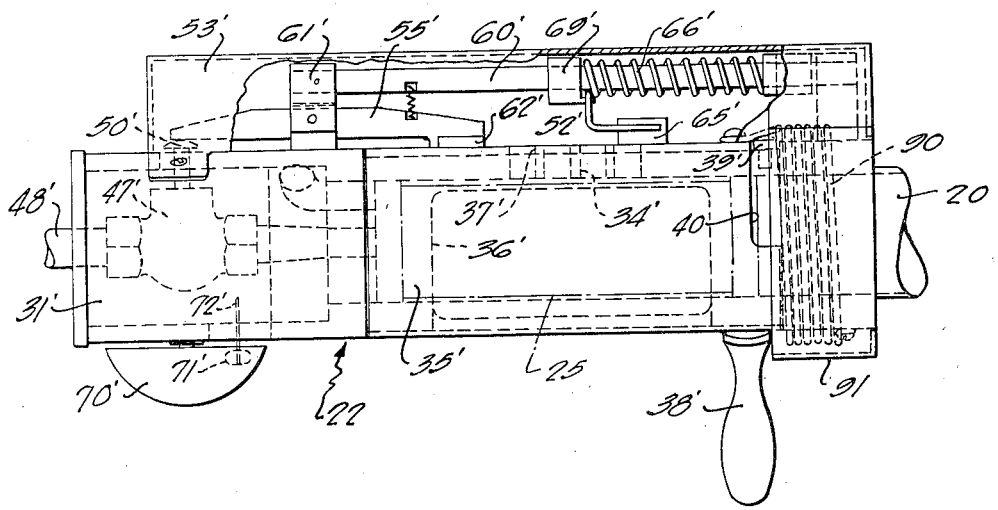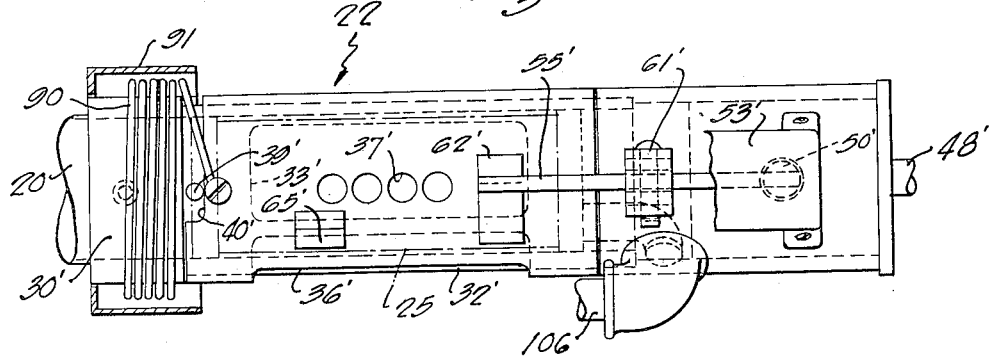

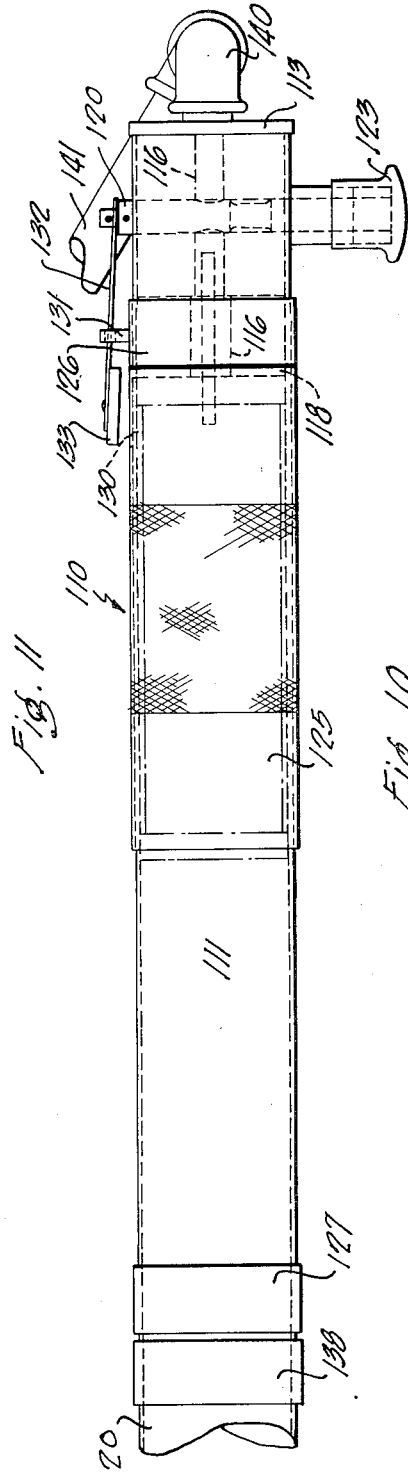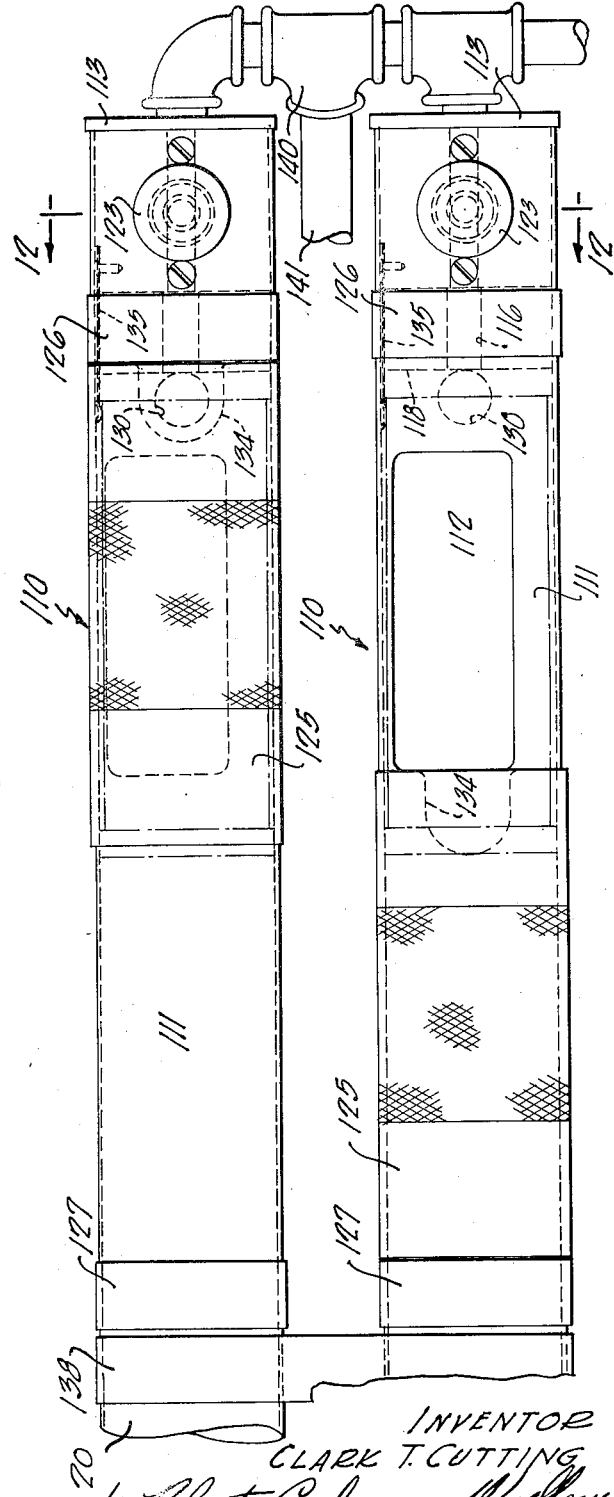

June 19, 1934.　　　　C. T. CUTTING　　　　1,963,779
PNEUMATIC DISPATCH SYSTEM
Filed Oct. 28, 1931　　　5 Sheets-Sheet 5

INVENTOR
CLARK T. CUTTING
by Roberts, Cushman & Woodberry
ATT'YS

Patented June 19, 1934

1,963,779

UNITED STATES PATENT OFFICE 1,963,779

PNEUMATIC DISPATCH SYSTEM

Clark T. Cutting, Syracuse, N. Y., assignor to The Lamson Company, Syracuse, N. Y., a corporation of Massachusetts Application October 28, 1931, Serial No. 571,478

16 Claims. (Cl. 243—19)

This invention relates to an improvement in a pneumatic dispatch system, and more particularly to such system in which the carriers remain at all times within the system, as set forth for example in the copending application of Chester S. Jennings, Serial No. 569,156, filed October 16, 1931, the present invention being a further development of the invention on which such application is based.

The objects of this invention are to provide in a pneumatic dispatch system, oval tubes and correspondingly formed carriers whereby the carriers are maintained in a fixed relation to the tubes and terminals so that the carriers are always in the access position at the terminals; control means by which the carriers are dispatched from the terminals; means at each terminal to indicate the arrival of a carrier thereat; means whereby the travel of the carriers in either direction may be controlled at one terminal; and other features which will appear from a consideration of the following description and of the drawings which form a part thereof and in which:

Fig. 1 is a view illustrating diagrammatically a system embodying one form of this invention;

Fig. 2 is a side elevation with parts broken away of the terminals at one end of the tubes;

Fig. 3 is a plan view of one of such terminals;

Figure 4:
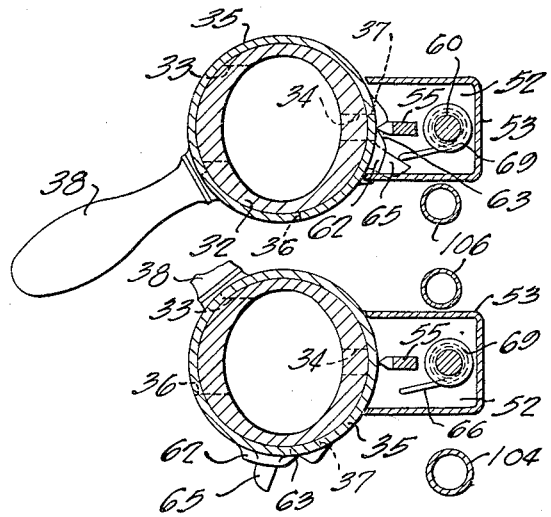
Figure 5:
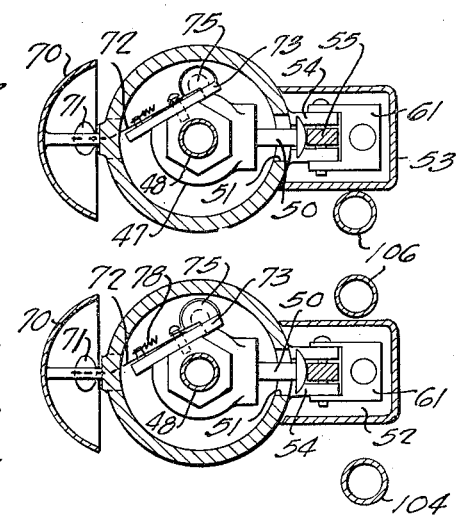
Figure 6:
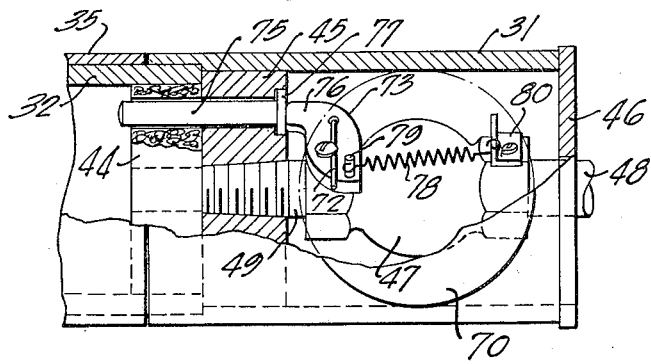
Figure 12:
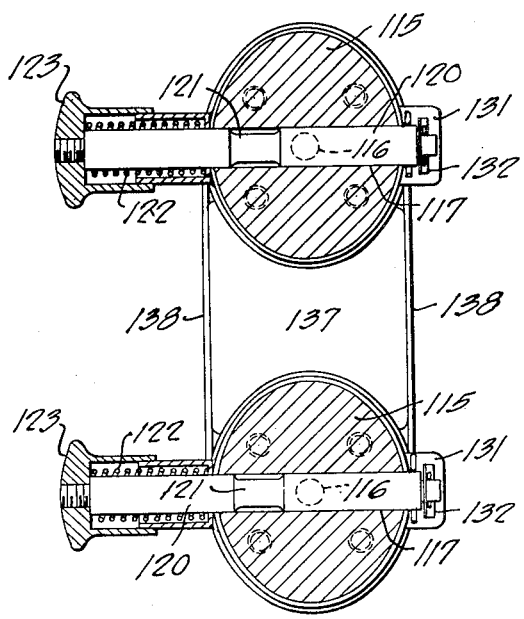
Figure 13:
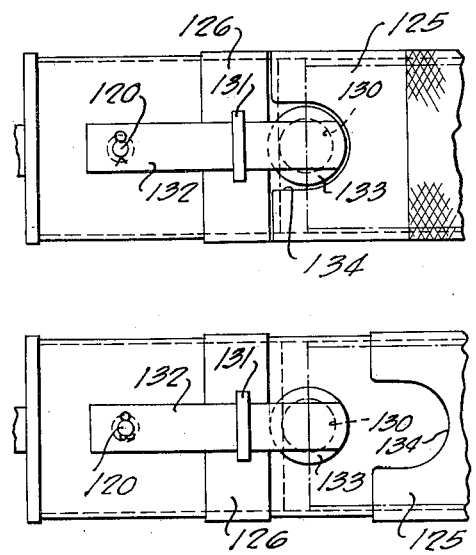
Figure 14:
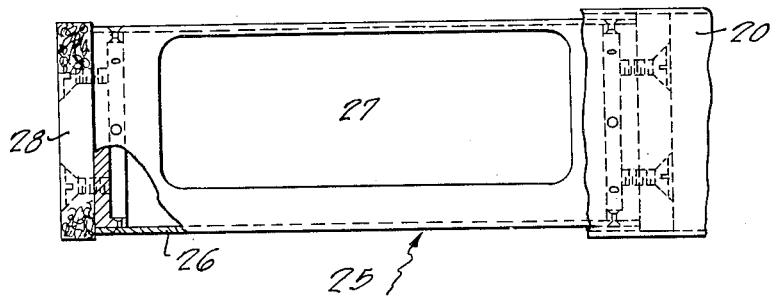
Figure 15:
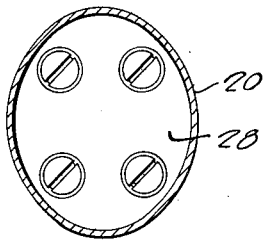

Figs. 4 and 5 are sectional views taken along the lines 4—4 and 5—5 in Fig. 2;

Fig. 6 is a view partially in section illustrating a detail of such terminal;

Fig. 7 is a side elevation and Fig. 8 is a plan view, with parts broken away, of a terminal at the other end of a tube;

Fig. 9 is a rear elevation of such terminal;

Fig. 10 is a side elevation and Fig. 11 a plan view of another form of terminal which might be employed in this invention;

Fig. 12 is a sectional view taken along the line 12—12 in Fig. 10;

Fig. 13 is a rear elevation of a portion of such terminal;

Fig. 14 is a side elevation with parts broken away of a carrier adapted for use in the illustrated system and the tube thereof; and Fig. 15 is an end elevation of a carrier in the tube.

One use of this invention is in a bus or other vehicle, and accordingly I have elected to show in the drawings and will describe an embodiment thereof adapted for this purpose, it being understood, however, that this embodiment has been chosen for the purpose of illustration only and not of limitation.

As shown in the drawings, the system adapted to be installed in a motor bus comprises two tubes 20, each tube connecting a terminal 21 with a terminal 22. When used in a bus the terminals 21 will be at the driver's station and the terminals 22 will each be at a passenger's station. Accordingly, for ease in differentiation and description, the terminals 21 will hereinafter be defined as driver's terminals and the terminals 22 defined as passenger's terminals. While only two tubes 20 are here shown, it is of course obvious that this number may be increased or diminished as desired.

The tubes 20 are each oval in cross section (see Fig. 15) and the carriers 25 which travel therein are similarly formed so that they are prevented from rotating and remain at all times in the same plane. As shown in Figs. 14 and 15, the carrier comprises a hollow body member 26, having an opening 27 in one side, and end walls 28, the latter having a periphery which conforms to contour of the tube (see Fig. 15).

The terminals 21 at the driver's station are identical in construction and operation as are the terminals 22 at the passenger's stations. One only of each terminal 21 and 22 will therefore be described in detail.

The driver's station has in the elected embodiment two terminals 21 mounted upon the wall of the bus one above the other. Each terminal comprises a pair of spaced cylindrical tubes 30, 31 mounted at the ends of a tube 32, of which the outer periphery is circular while the inner periphery is oval to form an extension of the tube 20 which enters the tube 30 and is secured therein in any suitable way in abutment with the end of the tube 32. The tube 32 has an opening 33 in one side thereof with which the carrier opening 27 registers when the carrier is in the terminal. In the opposite side of the tube 32 are provided a plurality of vent apertures 34 for a purpose to be described later.

Surrounding the portion of the tube 32 between the tubes 30 and 31 is a rotatable sleeve or cover 35 which has an opening 36 which may be brought into register with the opening 33, and holes 37 which may be brought into register with the apertures 34. A handle 38 on the cover facilitates its rotation and its travel is limited by a pin 39 carried by the tube 32 which enters a notch 40 formed in one edge of the cover.

The outer end of the tube 32 is closed by a disk 44 of felt or similar material which receives the impact of the carrier and is backed by a block 45 fixed in the tube 31. The outer end of the tube 31 is closed by a plate 46, the block and plate thus defining the ends of a compartment in which is mounted an air valve 47 of any well known construction. The interior of the valve 47 is connected by a pipe 48 to an air line to be described later, and to the interior of the tube 32 by a thimble 49 which passes through the block 45 and disk 44. The valve 47 includes a piston or similar element (not shown) which normally closes the end of the pipe 48 and cuts off the connection between the terminal and the air line. A plunger 50 for operating the valve element, projects through a hole 51 in the tube 31 into a chamber 52 formed by a casing 53 removably secured to the tubes 30, 31. Pivoted between ears 54 projecting into the chamber 52 from the tube 31 is a lever 55, one end of which rests upon the head of the plunger 50. The other end of the lever is yieldably held in contact with the cover 35 by spring means, as for example an expansion spring 56 seated in depressions in the lever 55 and in a rod 60. The rod 60 is fixed at one end in a block 61 carried by the ears 54 and supported at the other end by the inner end wall of the casing 53. A cam-like projection 62 carried by the cover 35 engages the lever 55 as the cover is moved into the closed position shown in the upper terminal of Fig. 4, and causes the lever 55 to depress the plunger 50 and open the valve 47. A notch 63 in the projection 62 receives the end of the lever and thus yieldably holds the cover in the proper position so that the holes 37 therein register with the apertures 34 (see Fig. 4) to provide outlet means through which air in the tube may escape to the atmosphere. When the cover 35 is closed the notch 63 is first carried beyond the lever 55 so that the holes 37 are out of register with the apertures 34, and in order to return the cover to the position shown in Fig. 4, there is provided upon the cover a tongue 65 which engages one end of a spring 66 coiled around the rod 60. The spring 66 is secured at one end to a collar 67 fixed to the rod and rests, adjacent the end engaged by the tongue 66, upon a finger 68 carried by a collar 69 also fixed upon the rod. It will be apparent from a consideration of Fig. 4 that when the notch 63 is carried by the closure of the cover beyond the lever 55, the tongue 65 will put the spring 66 under tension, and as soon as the handle 38 is released the spring will return the sleeve to the closed position shown in Fig. 4, with the apertures 34 and holes 37 in register.

As a signal to advise the driver of the arrival of a carrier, a bell 70 mounted upon the tube 31 is provided. The bell is struck by a hammer 71 mounted upon a rod 72 carried by a lever 73 pivotally mounted upon the valve 47. Reciprocally supported in the block 45 behind the disk 44 is a pin 75, the forward end of which extends beyond the face of the disk 44 and is struck by the carrier upon its arrival. The arm 76 of the lever 73 is held in contact with the head 77 of the pin by a spring 78 secured at one end to a pin 79 on the lever and at the other end to a bracket 80 carried by the valve. It will be noted that advantage has here been taken of the hexagonal form of the ends of the valve to position the lever and bracket.

The passenger's terminals 22 (see Figs. 7, 8 and 9) correspond substantially with the driver's terminals 21, and accordingly will not be described in detail, it being understood that the parts designated by the primes of numerals correspond to the parts of the driver's terminal by the same numerals. It is, however, desired that the covers 35' of the passenger's terminal remain closed under normal conditions, and accordingly a spring 90 is coiled around the tube 30', one end of the spring being secured to the tube and the other end secured to the sleeve 35'. An annular casing 91 surrounds the spring as shown in Figs. 7, 8 and 9.

It is desired that the carriers be transported in both directions by air pressure, which in the present instance is provided by an air line 100 at the driver's station to which air is supplied under pressure by a suitable blower or pressure tank B (see Fig. 1). A valve 101 is inserted in the air line to control the supply. The line 100 is connected to the pipes 48 of the terminals 21 by a pipe 103, and to the pipes 49' of the terminals 22 by a pipe 104 leading from the pipe 103.

If a passenger desires to dispatch money to the driver for change or tickets, he raises the normally closed cover 35' of the nearest terminal and inserts the money in the carrier thereat. When the cover is closed the lever 55' depresses the plunger 50' of the terminal valve 47' and sets up a flow of air from the main line 100 through pipes 103, 104 and 48', by which the carrier is transported through the tube 20 to the driver's terminal 21. The cover 35 of the driver's terminal will be either open or closed, and the air in front of the carrier will escape either through the opening 36 or the registered apertures 34 and holes 37, depending upon the position of the cover. Upon its arrival the carrier strikes the pin 75 and causes the hammer 71 to strike the bell 70. The driver then opens the cover 35, replaces the money with the proper change or tickets, and closes the cover 35, whereupon the carrier is dispatched to the terminal 22 by the flow of air from main line 100 through pipes 103, 49, the closure of the cover opening the valve 47.

The carriers are normally at the passenger's terminals 22 but conditions may arise under which a carrier should be at a driver's terminal 21. In order to permit this control by the driver, a pipe 105 is provided, which pipe is connected at one end to the pipe 103. The pipe 105 is also connected to each terminal 22 by a pipe 106, which includes a valve 107 at the driver's terminal. The valve 107 is normally closed but may be opened by depressing a plunger 108 so that the driver can bring to a terminal 21 a carrier then at the terminal 22 associated with the terminal 21.

In place of the terminals including a rotatable cover and automatic means for setting up a flow of air through the system, as above described, the form of terminal disclosed in Figs. 10 to 13 inclusive may be substituted. In the drawings are shown only substitutes for the driver's terminals 21, but it will be understood that the passenger's terminal may be replaced by similar terminals; in other words, the various terminals may be similar or there may be in the same system both types of terminals if desired.

The terminal 110 shown in the drawings is formed by an oval extension 111 of the oval transit tube 20. The extension has an opening 112 in one side, through which access to the carrier in the terminal is possible, and an end wall 113. Mounted in the end of the extension 111 is a valve comprising a block 115 having a longitudinal passage 116 through the center and a transverse passage 117. The passage 116 at one side of the passage 117 is continued through a felt disk or bumper 118 secured to the inner end of the block 115 to the interior of the tube extension 111, and at the other side is connected through the end wall to the main air line to be described later. Reciprocable in the transverse passage 117 is a valve opening plunger 120, which normally closes the passage 116. A recessed portion 121 of the plunger is held normally out of the passage 116 by a spring 122, and the plunger terminates at the forward end in a button 123, by which it can be advanced to open the passage 116.

The opening 112 is controlled by a sleeve or cover 125 slidable over the extension 111 between collars 126, 127 secured to the extension. In the rear wall of the extension 111 is formed an opening 130 which provides an outlet through which air in the terminal can escape to the atmosphere. Pivotally mounted upon a bracket 131 is a spring strip 132, to one end of which is secured a disk 133 adapted in one position to bear upon the extension 111 and seal the opening 130. The other end of the strip 132 is attached to the inner end of the plunger 120 so that the opening 130 is closed when the plunger is depressed to open the passage 116. A notch 134 in the cover permits the disk 133 to seal the opening 130 when the cover is closed. Fixed to the block 115 and extending past the disk 118, is a spring clip 135 which, when the carrier is in the terminal, engages one end wall thereof to hold the carrier in that position in which the opening 27 registers with the opening 112 in the extension. The tubes 20 may be separated by a block 137 and held in contact with the block by a strap 138. Air from the main line is fed by a pipe 140 to the passages 116 of the driver's terminals, and by the pipe 140 and a pipe 141 to the passenger's terminals.

The operation of the system having such terminals is believed to be apparent from the above description, and hence will merely be set forth in brief. When a carrier is to be dispatched from a terminal the cover 125 is closed and the button 123 pressed to advance the plunger 120, opening the passage 116 so that air may flow under pressure into the tube extension 111 and force the carrier along the tube to the other terminal and actuating the spring strip 132 to close the opening 130 with the disk 133 and prevent escape of air therethrough to the atmosphere. Upon its arrival at the receiving terminal the carrier engages the spring clip 135 so that the opening 27 therein is in register with the opening 112 and the contents can be removed upon opening the cover 125.

It will be noted that the contour of the tubes 20 and their extensions at the terminals and the contours of the carriers are such that the carriers at all times retain the same relation to the tubes and extensions, and consequently the openings in the side walls of the carriers register with the openings in the tube extensions at the terminals; that an escape opening to the atmosphere from each extension is provided, whether the terminal covers be open or closed, at the terminal to which a carrier is dispatched, and that the dispatch of a carrier from each terminal is, of necessity, accompanied by the closure of such escape opening except in the unusual situation where the driver dispatches a carrier from a passenger's terminal.

While one embodiment of this invention in a pneumatic dispatch system and two forms of terminals therefor have been shown and described, it will be understood that I am not limited thereto, and that other embodiments and forms can be made without departing from the spirit and scope of the invention as set forth in the following claims.

I claim:

1. In a pneumatic dispatch system including a transit tube non-circular in cross section, a carrier of complementary conformation having an opening therein and reciprocable in said tube, terminals connected by said tube, each terminal including an extension of the transit tube in which extension the carrier rests when at said terminal, said extension having an opening therein which registers with the carrier opening when the latter is in the terminal, and a cover surrounding said tube extension and movable thereover relative to the opening therein for closing or opening the same.

2. In a pneumatic dispatch system including a transit tube non-circular in cross section, a carrier of complementary conformation having an opening therein and reciprocable in said tube, terminals connected by said tube, each terminal including an extension of the transit tube in which extension the carrier rests when at said terminal, said extension having an opening therein which registers with the carrier opening when the latter is in the terminal, and a cover surrounding said tube extension and slidable thereover relative to the opening therein for closing or opening the same.

3. In a pneumatic dispatch system including a transit tube non-circular in cross section, a carrier of complementary conformation having an opening therein and reciprocable in said tube, terminals connected by said tube, each terminal including an extension of the transit tube in which extension the carrier rests when at said terminal, said extension having an opening therein which registers with the carrier opening when the latter is in the terminal, and a cover surrounding said tube extension and rotatable about said extension, said cover having an opening therein which may be brought by such rotation into registry with the opening in the extension.

4. In a pneumatic dispatch system including a transit tube non-circular in cross section, a carrier of complementary conformation having an opening therein and reciprocable in said tube, terminals connected by said tube, each terminal including an extension of the transit tube in which extension the carrier rests when at said terminal, said extension having an opening therein which registers with the carrier opening when the latter is in the terminal, and a cover surrounding said tube extension and slidable longitudinally thereover relative to the opening therein for closing or opening the same.

5. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover for closing said opening independent of said escape outlet, yieldable means for holding the cover in such position, and means for setting up a flow of transporting air against one end of the carrier in the terminal for dispatching the carrier therefrom.

6. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover for closing said opening independent of said escape outlet, yieldable means for holding the cover in such position, and means for closing said outlet and simultaneously setting up a flow of transporting air against one end of the carrier in the terminal for dispatching the carrier therefrom.

7. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover for closing said opening and escape outlet, a valve in the terminal through which, when open, a flow of transporting air is directed against one end of the carrier in the terminal to dispatch the carrier therefrom, means actuated by the cover during its closing movement for opening said valve, and means for thereafter shifting said cover into a position in which the opening only is closed, the escape outlet being open.

8. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover for closing said opening and escape outlet, a valve in the terminal through which, when open, a flow of transporting air is directed against one end of the carrier in the terminal to dispatch the carrier therefrom, means actuated by the cover during its closing movement for opening said valve, and means for thereafter shifting said cover into a position in which the opening only is closed, the escape outlet being open, and for permitting said cover actuated means to shift from the valve opening position.

9. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, said outlet comprising a plurality of apertures, a cover rotatable about said tube extension and having holes which in one position register with said apertures, a valve in the terminal through which, when open, a flow of transporting air is directed against one end of the carrier in the terminal to dispatch the carrier therefrom, and means, actuated by the rotation of the cover out of the position in which the holes register with the apertures of the escape outlet, for opening said valve.

10. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, said outlet comprising a plurality of apertures, a cover rotatable about said tube extension and having holes which in one position register with said apertures, a valve in the terminal through which, when open, a flow of transporting air is directed against one end of the carrier in the terminal to dispatch the carrier therefrom, means, actuated by the rotation of the cover out of the position in which the holes register with the apertures of the escape outlet, for opening said valve, and means for restoring said cover into the hole registering position and releasing the cover actuated valve opening means.

11. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, said outlet comprising a plurality of apertures, a cover rotatable about said tube extension and having an opening therein which registers with said outlet when the opening in the extension is closed by the cover, a valve in the terminal through which, when open, a flow of transporting air is directed against one end of the carrier in the terminal to dispatch the carrier therefrom, means for opening said valve, and a cam-like projection on said cover which, when the cover is rotated, engages and actuates said valve opening means.

12. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover rotatable about said tube extension and having an opening therein which registers with said outlet, when the opening in the extension is closed by the cover, a valve in the terminal through which, when open, a flow of transporting air is directed against one end of the carrier in the terminal to dispatch the carrier therefrom, means for opening said valve, a cam-like projection on said cover, which, when the cover is rotated, engages and actuates said valve operating means, said projection having a notch therein, a tongue projecting from said cover, and yieldable means which engage said tongue, when the cover is rotated into a valve opening position, beyond the registering position, and restore the cover to the registering position, at which position the valve opening means enters said notch.

13. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover for the opening surrounding said tube and slidable longitudinally thereover, a notch in said cover which, when the cover is in the opening closing position, permits said outlet to remain open, a valve in said terminal through which, when open, a flow of transporting air is directed against one end of the carrier in the terminal to dispatch the carrier therefrom, means for opening said valve, and means for closing said outlet, said last-named means being moved into closing position by said valve opening means.

14. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover for the opening surrounding said tube and slidable longitudinally thereover, a notch in said cover which, when the cover is in the opening closing position, permits said outlet to remain open, a valve in said terminal through which, when open, a flow of transporting air is directed against one end of the carrier in the terminal to dispatch the carrier therefrom, means for opening said valve, means for closing said outlet, said last-named means being moved into closing position by said valve opening means and comprising a spring strip pivoted upon the terminal, and a disk at one end of the strip by which the outlet is closed, the other end of said strip being attached to said valve opening means and moved pivotally thereby.

15. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, a bumper to receive the carrier at the terminal, a signal at said terminal actuated by the carrier upon its arrival at the bumper, and a cover surrounding said extension to close the opening therein.

16. In a pneumatic dispatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, a bumper to receive the carrier at the terminal, a signal at said terminal actuated by the carrier upon its arrival at the bumper, said signal including a pin projecting beyond the bumper and reciprocable in a passage therethrough, which pin is struck and reciprocated by the leading end of the carrier, and a cover surrounding said extension to close the opening therein.

CLARK T. CUTTING.